Oct. 6, 1925.
H. W. PLEISTER
TOGGLE
Filed July 29, 1924
1,556,345
2 Sheets-Sheet 1
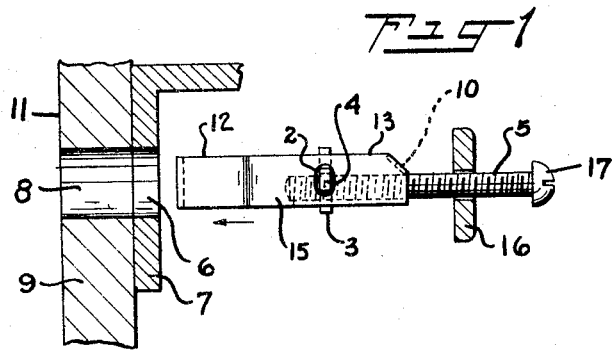
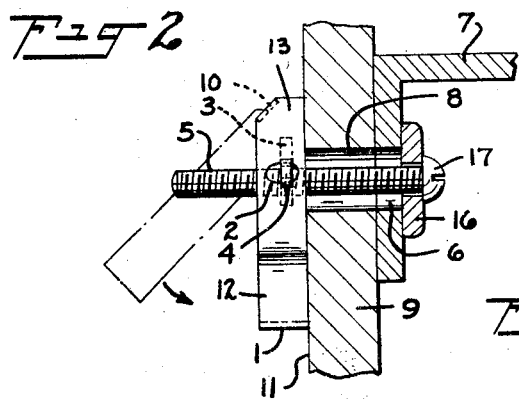
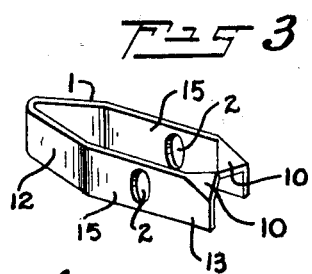
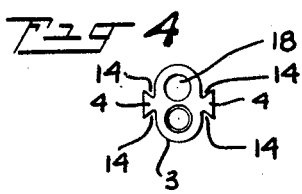
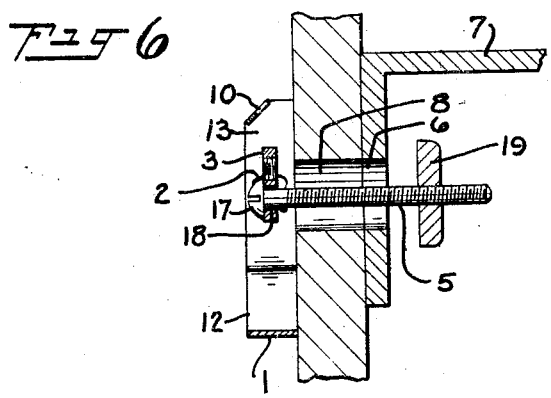
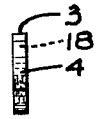
INVENTOR
Henry W. Pleister
BY
Alanhu Johnson
ATTORNEY Oct. 6, 1925.
H. W. PLEISTER
TOGGLE
Filed July 29, 1924
1,556,345
2 Sheets-Sheet 2
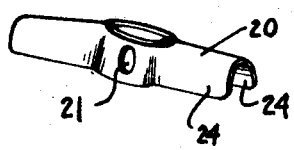
Fig. 7
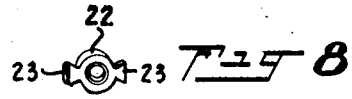
Fig. 8
Fig. 11
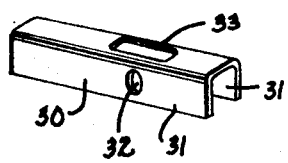
Fig. 9
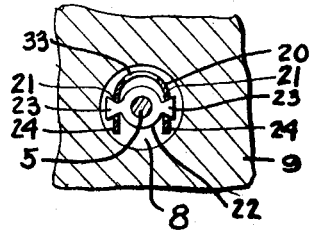
Fig. 10
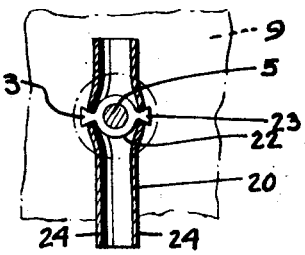
Fig. 12
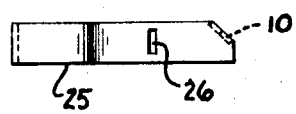
Fig. 13
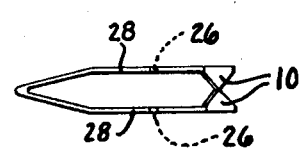
Fig. 14
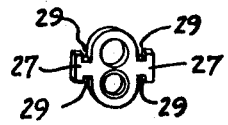
Henry W. Pleister INVENTOR
BY
Alan... Johnson ATTORNEY Patented Oct. 6, 1925.

1,556,345

UNITED STATES PATENT OFFICE.

HENRY W. PLEISTER, OF WESTFIELD, NEW JERSEY, ASSIGNOR TO HENRY B. NEWHALL.

TOGGLE.

Application filed July 29, 1924. Serial No. 728,898.

*To all whom it may concern:*

Be it known that I, HENRY W. PLEISTER, a citizen of the United States, residing at Westfield, in the county of Union and State of New Jersey, have made certain new and useful Improvements in Toggles, of which the following is a specification taken in connection with the accompanying drawings.

My invention relates to securing devices, and more particularly to what is known in the art as toggles, which are employed to secure objects to walls or other suitable supports where the back of the wall is inaccessible. In such devices the toggle head is inserted into the hole in the wall while it is parallel with the bolt or screw, and when the toggle head clears the inner surface of the wall it swings or pivots upon a pivoting member, usually a nut; the toggle head then bridges the inaccessible end of the hole and permits the bolt to be screwed up and secure the object or work to the exposed surface of the wall.

My invention relates more particularly to the toggle head and the pivoting member. My invention further relates to certain articles of manufacture, combinations and details of construction which will be more fully hereinafter described and pointed out in the claims.

In the accompanying drawings showing illustrative embodiments of my invention, and in which the same reference numerals refer to similar parts in the several figures;

Fig. 1 is a vertical section showing the manner of applying my toggle to a wall, the toggle being in side elevation;

Fig. 2 is a vertical section, similar to Fig. 1, showing the parts after the toggle head has swung down and the work is secured to the wall or partition;

Fig. 3 is a perspective view of one form of my toggle head;

Fig. 4 is a front elevation of one form of pivoting member which I may employ;

Fig. 5 is a side elevation of the pivoting member shown in Fig. 4;

Fig. 6 is a vertical section showing a different manner of attaching the bolt to the pivoting member;

Fig. 7 is a perspective view of a modified form of toggle head;

Fig. 8 is a perspective view of a pivoting member to be employed with the head shown in Fig. 7;

Fig. 9 is a fragmentary vertical section showing the position of the pivoting member and the head as the toggle is being passed into the hole in the wall, and while the head is parallel to the bolt;

Fig. 10 is a vertical section of the same form of my invention as shown in Figs. 7, 8 and 9, after the toggle head has swung down and is at right angles to the bolt; the wall in this view being indicated in broken lines;

Fig. 11 is a perspective view of a modified form of toggle head;

Fig. 12 is a side elevation of another modified form of the toggle head;

Fig. 13 is a plan view of the modified head shown in Fig. 12;

Fig. 14 is a perspective view of a modified form of pivoting member, which may be employed, more particularly, in the form of head shown in Figs. 12 and 13.

The common practice in this art is to attach the pivoting member, usually a nut provided with round trunnions to the head of the toggle by passing its round trunnions through round holes in the sides of the toggle head, and then upsetting the ends of the round trunnions, so that they cannot be readily removed. This is expensive and requires more or less skilled labor. Instead of upsetting the ends of such round trunnions, it is common to swage or work the sides of the head adjacent to the round holes so as to hold the trunnions in place, without upsetting their ends. This latter method is more economical than the former, but has the disadvantage that when the toggle is placed in position any extreme tension applied to the toggle head will frequently cause the sides of the head to open or spread, allowing the nut, bolt and work to drop.

By my invention I avoid the expense of upsetting the ends of the trunnions, and yet insure that even when extreme strains are thrown upon the toggle the pivoting nut will firmly and securely lock the sides of the toggle head and prevent the toggle head spreading. Should the head spread or open, the nut would become separated from the toggle head and permit the work to fall.

My invention may be applied to various forms of toggle heads. In the drawings I have shown by way of illustration several forms of my invention, but of course, it is to be understood that my invention is not to be confined to the particular forms shown by way of illustration.

In Figs. 1 to 6 I employ a toggle head 1 formed from stamped sheet metal, bent back on itself to form a substantially V-shaped member, and provide the toggle head with two non-circular bearing holes 2, 2. In the form shown in these figures these bearing holes are elliptical with the shortest axis parallel to the longitudinal axis of the toggle head; the longest axis of the holes is at right angles to the longitudinal axis of the toggle head. With this toggle head I employ a pivoting member 3 having undercut trunnions 4, 4. The arrangement is such that the length of the trunnions 4, 4 substantially equals the longest diameter of the elliptical bearing holes 2, 2 so that they can be readily mounted or inserted in these elliptical bearing holes 2, 2 when the parts are in their inoperative position; that is, when the head and pivoting nut are in position to receive the bolt 5. After the bolt 5 is threaded into the pivoting nut 3, the toggle head 1 is inserted through the hole 6 in the work 7 and into the hole 8 in the wall partition or other suitable support 9. To insure that the toggle head will keep its proper position with relation to the bolt 5, I preferably bend in the ends of the toggle head to form the stops 10, 10 which engage with the bolt 5, as shown in Fig. 1.

As soon as that end of the toggle head having these stops 10, 10 passes the inner surface 11 of the wall or other suitable support 9, the portion 12 of the head will cause the head to rock upon the trunnions 4, 4 for the reason that this portion 12 of the head overbalances the other portion 13 of the head. As the toggle head swings down, as shown in broken lines and by the arrow in Fig. 2, the position of the undercut trunnions 4, 4 is changed, in that the shortest diameter of the elliptical bearing holes 2, 2 is now at right angles to the position it was originally. This causes the metal of the toggle head at these points to be received in the cut away portions 14, 14 of the trunnions 4, 4 which will prevent the sides 15, 15 of the toggle head springing or collapsing, thereby insuring that the toggle head will securely hold the work 7 to the wall or other suitable support 9, regardless of the strains that may be thrown upon the toggle. In tightening up the work 7, a washer 16 is usually employed to cover the hole in the work, unless the head 17 of the bolt 5 is sufficiently large to bridge the hole 6.

In the particular form of pivoting member 3, which I have illustrated in these figures, I have provided the member with another hole 18 which is unthreaded. This permits the reversal of the head 17 of the stove or other bolt 5, by slipping it through the hole 18, leaving the head 17 in contact with the pivoting member 3, the stem of the bolt extending out on the front of the work 7 where it will be secured by a nut 19 (Fig. 6).

I have shown another modification of my invention in Figs. 7, 8, 9 and 10 in which a different form of toggle head 20 is employed having the elliptical bearing holes 21, 21 to cooperate with the nut 22 having the undercut trunnions 23, 23 the same as in the figures previously described. In Fig. 9 it will be noted that the trunnions 23, 23 are adapted to pass freely through the elliptical pivoting holes 21, 21 because the parts are, in this figure, illustrated as they are being mounted within the hole 8 in the wall or other suitable support 9. As soon as the toggle head 20 swings down and contacts with the rear surface 11 of the wall or other suitable support 9, (Fig. 10), (as shown for example with the other form in Figs. 2 and 6) the undercut trunnions 23, 23 cannot be withdrawn from the elliptical bearing holes 21, 21, so that it is impossible to spread the sides 24, 24 of the head because, in this position of the parts, the undercut surfaces of the trunnions 23, 23 act as a lock to prevent such action.

In Figs. 12, 13 and 14 I have shown another modification of my invention in which the toggle head 25 is similar to the toggle head shown in Fig. 3, but in this case the bearing holes 26, 26 are rectangular and adapted to cooperate with undercut trunnions 27, 27 which are substantially T-shaped, as shown in Fig. 14. It will be seen that these trunnions 27, 27 can be sprung into the rectangular bearing holes 26, 26 in one position of the parts, but that when the head swings down, as shown for example in the form illustrated in Figs. 2 and 6, the sides 28, 28 of the toggle head 25 will become locked in the cutaway portions 29, 29 of the trunnions 27, 27 which will prevent these sides 28, 28 spreading, and insure that the toggle head will not fail or drop the work under any strains that can be exerted upon it by the bolt 5 or the work 7.

In Fig. 11 I have shown a channel toggle head 30 having sides 31, 31 provided with elliptical bearing holes 32, 32, acting in all respects as the forms previously described. In this form, and the form shown in Fig. 7, the head is provided with a hole 33 to permit the passage of the bolt 5 when the work 7 is secured to the wall.

Having thus described this invention in connection with illustrative embodiments thereof, to the details of which I do not desire to be limited, what is claimed as new and what is desired to secure by Letters Patent is set forth in the appended claims.

What I claim is:—

1. The combination of a toggle head having pivots, and a pivoting member removably mounted on the pivots of the toggle head, said pivoting member being removable from the head in one position of the parts, and locked to the toggle head in another position of the parts.

2. The combination of a toggle head provided with pivoting surfaces and a pivot member having undercut trunnions to engage with the pivoting surfaces of the toggle head.

3. The combination of a toggle head having non-circular pivoting surfaces and a pivot member having undercut trunnions to engage with the non-circular pivoting surfaces of the toggle head.

4. The combination of a toggle head having non-circular pivoting holes, the shortest diameter of the holes being parallel to the longitudinal axis of the head, and the longest diameter of the pivoting holes being substantially at right angles to the longitudinal axis of the toggle head, and a pivot member having undercut trunnions adapted to be inserted in the pivoting holes in one position of the parts and to be locked to the toggle head in another position of the parts.

HENRY W. PLEISTER.